Feb. 26, 1952     J. O. ANTONSON     2,587,428
TIRE CONSTRUCTION
Filed March 25, 1947
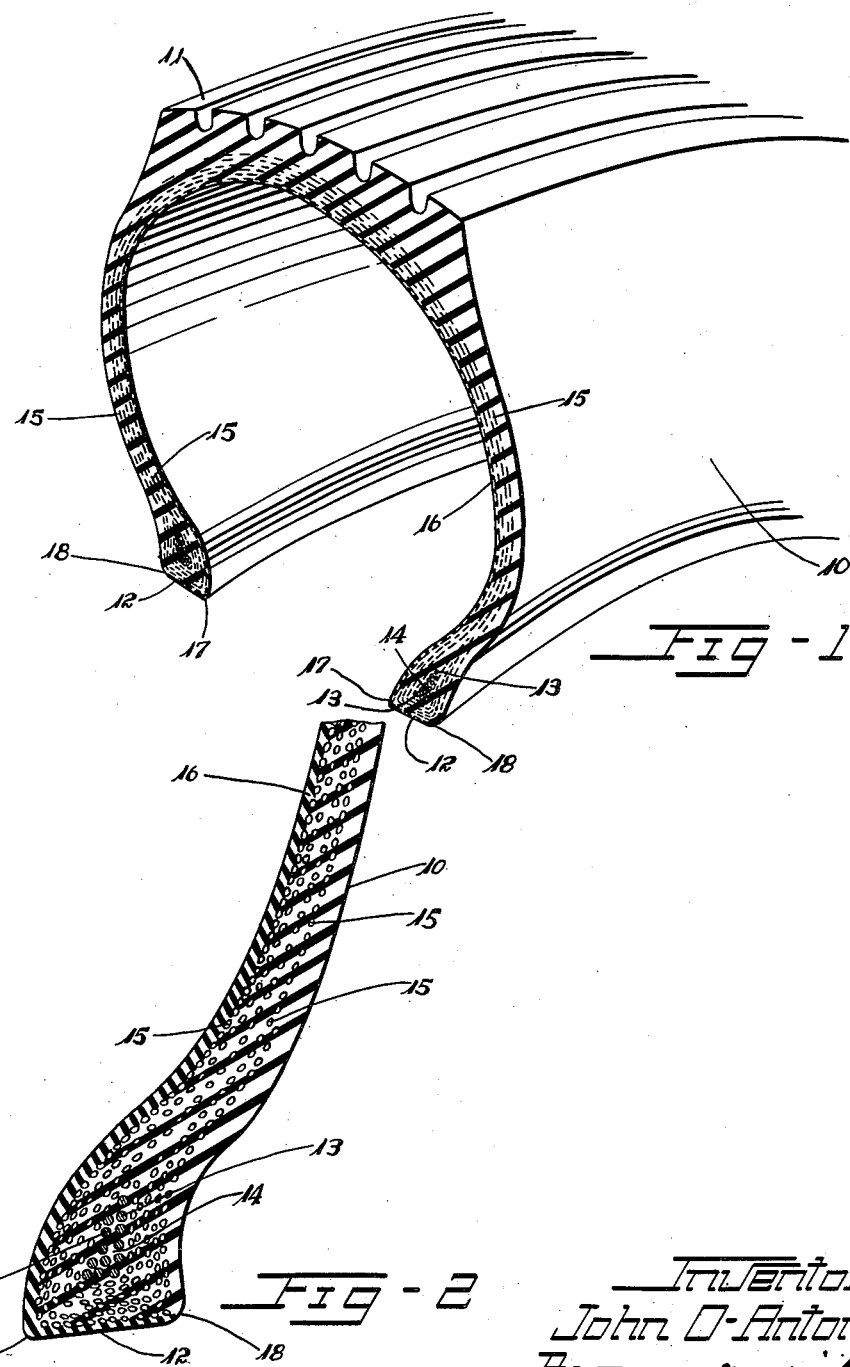
Inventor
John O. Antonson

Patented Feb. 26, 1952

2,587,428

UNITED STATES PATENT OFFICE 2,587,428

TIRE CONSTRUCTION

John O. Antonson, Akron, Ohio, assignor to The B. F. Goodrich Company, New York, N. Y., a corporation of New York Application March 25, 1947, Serial No. 737,117

6 Claims. (Cl. 152—354)

This invention relates to pneumatic tires and especially to the construction of tires which are suitable for use without inner tubes, and of tires which are capable of being molded and vulcanized without the use of curing bags.

In the molding operation curing bags are subjected to great heat and high pressures under which failure may occur prematurely. Such failure is especially undesirable because the water, steam and air which escape from the bag may seep into the casing if the latter is of the conventional type which is not impervious to such fluids, and the seepage of such fluids into the casing is likely to cause blisters and ply separation in the casing.

It has been found that by lining the inner surface of the casing with a suitable material such as butyl-type rubber which has the desirable property of being highly impervious to fluids, seepage from within the casing into the wall thereof can be effectively prevented. The open base of the casing may be sealed by an annular ring or other suitable sealing means and the fluid injected through the ring into the casing so that the lined casing may be cured and molded without a curing bag.

The completed casing with its highly impervious lining may be used with an inner tube or it may be inflated on the rim for use without an inner tube, the opening between the beads of the casing being suitably closed and sealed to provide an air-tight space in the casing.

A highly impervious material such as butyl-type rubber for the lining of the casing has, however, been found not to lend itself readily to secure bonding of it to the rubber or other rubber-like materials normally used in tire casing construction, and effective strength of the attachment of this lining to the casing wall is essential if the tire is to be commercially feasible.

Objects of this invention are to provide a tire construction in which there is good adherence between the casing and a lining of material which has greater permeability than the material of the casing to fluids such as air, steam and water; to provide for obtaining the benefits of butyl-type rubber in this respect while at the same time providing for effectively uniting the butyl-type lining with the tire wall; to provide a tire casing suitable for curing without the use of a curing bag; to provide a pneumatic tire suitable for use without an inner tube; and to provide for simplicity of construction and convenience of manufacture.

These and further objects will be apparent from the following description, reference being had to the accompanying drawings in which:

Fig. 1 is a cross-sectional view in perspective of a tire constructed in accordance with and embodying the invention.

Fig. 2 is a cross-section on an enlarged scale of a part of a tire wall including a bead portion.

The tire illustrated in the drawing comprises a body of natural rubber or other rubber-like material normally used for tire body construction having a wall portion of body material 10 including a tread 11 and terminating in bead portions 12, 12 which may include the usual rings of bead wire 13, 13 encased in rubber or other rubber-like material 14. The tire wall 10 is reinforced by plies 15, 15 embedded therein which may be of any suitable material for the purpose, such as woven or weftless cord fabric of cotton, rayon, wire or the like with or without dipping treatment thereof for such purposes as protection against mildew and promotion of adhesion to other material of the tire. The tire illustrated has four cord plies in its wall although the number of plies and the material thereof may be varied as desired.

The casing is provided at its inner face with a lining layer 16 of suitable flexible, durable and relatively impermeable material to prevent objectionable diffusion of fluid from within the casing into and through the wall, such diffusion, as hereinabove discussed, being objectionable not only from the standpoint of loss of inflation pressure, but also because a high rate of diffusion of air or other fluid into the wall tends to develop blisters and separation of the fabric plies from the rubber and lessen the service life of the tire. The lining layer 16 preferably is extended down to the bead portion around the toe 17 of the bead portion and to the heel 18.

The butyl-type of synthetic rubber, which are copolymers of isobutylene and a diolefine such as butadiene or isoprene, are found to be well suited for the purpose of this lining layer 16. Such butyl-type rubber exhibits good properties of flexibility and resilience and gives good results even when the layer is relatively thin so that this lining layer together with the fabric-reinforced rubber composition normally used in the tire body are as a composite unit well able to withstand rapid cyclic flexing stresses in use.

The butyl-type rubber, however, has been found to be difficult to adhere reliably to the types of rubber or other rubber-like material ordinarily used in tire sidewalls to enclose the reinforcing plies whether by attempted use of natural tack of the material or of special adhesion.

By utilizing the construction of the invention a strong bond may be provided between the lining 16 and the body material 10. In this construction the body material 10 may be applied as by calendering to the cords of the plies 15, 15. The body material 10 being calendered on both faces of the plies except that, on the innermost ply the body material is applied on one side only of this ply, so that the cords of the ply are embedded in the body material in a manner short of being completely covered. The lining material 16 is then applied directly against the exposed face of this cord ply which is bare of the body material 10 so that during the molding operation the lining material may flow into the crevices of the twisted elements of the cord and about such elements so as to grip the same securely. A good bond will result as the lining 16 will be anchored directly to the cords which are in turn bonded to the body material 10 of the casing. By this construction good adherence is obtained between the lining 16 and the body material 10 and a strong integral body structure is provided.

Tires so constructed may be successfully molded and vulcanized without the use of curing bags, it being feasible to use internal inflating and heating fluids directly against the inner face of the tire. Also, the tire may be used under inflation without an inner tube as hereinbefore described.

Variations may be made without departing from the scope of the invention as it is defined in the following claims.

I claim:

1. A pneumatic tire comprising a hollow annular body of resilient rubber material including wall portions subject to flexure under the stresses on the tire in use, plies of reinforcing cords of twisted elements disposed in said wall portions with said rubber material between said plies and between and adhered to said cords, the inner face of the innermost of said plies being bare of said rubber material of said body, and a sealing layer of flexible material of greater impermeability to fluids than said rubber material of said body united directly to said inner face of said innermost ply by direct anchorage of said sealing layer in the crevices of the twisted elements of the cords so that said sealing layer by virtue of its union with said cords constitutes an integral part of said wall portions to flex therewith as a unit under the stresses on the tire in use.

2. A pneumatic tire comprising a hollow annular body of resilient rubber material including wall portions subject to flexure under the stresses on the tire in use, plies of reinforcing cords of twisted elements disposed in said wall portions with said rubber material between said plies and between and adhered to said cords, the inner face of the innermost of said plies being bare of said rubber material of said body, and a sealing layer of butyl-type rubber of greater impermeability to fluids than said rubber material of said body united directly to said inner face of said innermost ply by direct anchorage of said sealing layer in the crevices of the twisted elements of the cords so that said sealing layer by virtue of its union with said cords constitutes an integral part of said wall portions to flex therewith as a unit under the stresses on the tire in use.

3. A pneumatic tire suitable for use upon a rim without an inner tube, said tire comprising an open-bellied body of resilient rubber material including wall portions subject to flexure under the stresses on the tire in use terminating in spaced-apart rim-engaging bead portions, plies of reinforcing material having twisted elements extending from bead portion to bead portion disposed in said wall portions with said rubber material between said plies and adhered to said twisted elements, the inner face of the innermost of said plies being bare of said rubber material of said body exposing said twisted elements, and a layer of flexible material of less permeability to air than said rubber material of said body adhered directly to said inner face of said innermost of said plies by direct anchorage of said layer of flexible material in the crevices of said twisted elements so that said layer of flexible material by virtue of its union with said twisted elements constitutes an integral part of said wall portions to flex therewith as a unit under the stresses of the tire in use.

4. A pneumatic tire suitable for use upon a rim without an inner tube, said tire comprising an open-bellied body of resilient rubber material including wall portions subject to flexure under the stresses on the tire in use terminating in spaced-apart rim-engaging bead portions, plies of reinforcing material having twisted elements extending from bead portion to bead portion disposed in said wall portions with said rubber material between said plies and adhered to said twisted elements, the inner face of the innermost of said plies being bare of said rubber material of said body exposing said twisted elements, and a layer of flexible material including butyl-type rubber of less permeability to air than said rubber material of said body adhered directly to said inner face of said innermost of said plies by direct anchorage of said layer of flexible material in the crevices of said twisted elements so that said layer of flexible material by virtue of its union with said twisted elements constitutes an integral part of said wall portions to flex therewith as a unit under the stresses of the tire in use.

5. A pneumatic tire comprising an annular hollow body of resilient rubber material including a tread portion and sidewalls, a plurality of cord plies embedded in said tread portion and said sidewalls and united in spaced-apart relation by said rubber material of said body, the innermost of said plies being embedded in said rubber material of said body short of being completely covered so as to present an exposed ply face having cords with portions thereof free of said rubber material of said body, and a lining of flexible material of greater impermeability to fluids than the rubber material of said body adhered to the portions of said cords free of said rubber material of said body so that said lining by virtue of its union with said cords constitutes an integral part of said wall portions to flex therewith as a unit under the stresses on the tire in use.

6. A pneumatic tire comprising an annular hollow body of resilient rubber material including wall portions subject to flexure under the stresses on the tire in use, plies of reinforcing cords of twisted elements disposed in said wall portions with said rubber material between said plies and between and adhered to said cords, the innermost of said plies having portions of said reinforcing cords free of said rubber material of said body and a sealing layer of flexible material including butyl-type rubber of greater impermeability to fluids than said rubber material of said body united directly to said portions of said reinforcing cords free of said rubber material by direct anchorage of said sealing layer in the crevices of said twisted elements of said cords so that said sealing layer by virtue of its union with said cords constitutes an integral part of said wall portions to flex therewith as a unit under stresses on the tire in use.

JOHN O. ANTONSON.

REFERENCES CITED

The following references are of record in the file of this patent:

UNITED STATES PATENTS

| Number | Name | Date |
| --- | --- | --- |
| 1,412,535 | Martin | Apr. 11, 1922 |
| 1,443,652 | Savage | Jan. 30, 1923 |
| 1,903,575 | Shoemaker | Apr. 11, 1933 |
| 2,392,590 | Hulswitt et al. | Jan. 8, 1946 |
| 2,429,397 | Compton et al. | Oct. 21, 1947 |
| 2,499,724 | Compton | Mar. 7, 1950 |